United States Patent
Csihony et al.

(10) Patent No.: US 10,975,325 B2
(45) Date of Patent: Apr. 13, 2021

(54) POLY(METH)ACRYLATE COPOLYMERS WITH BRANCHED C17 ALKYL CHAINS AND THEIR USE IN LUBRICANT OIL COMPOSITIONS

(71) Applicant: BASF SE, Ludwigshafen am Rhein (DE)

(72) Inventors: Szilard Csihony, Ludwigshafen (DE); Mary Elizabeth Dery, Tarrytown, NY (US); Philippe Rabbat, Tarrytown, NY (US); Ryan James Fenton, Tarrytown, NY (US)

(73) Assignee: BASF SE, Ludwigshafen am Rhein (DE)

( * ) Notice: Subject to any disclaimer, the term of this patent is extended or adjusted under 35 U.S.C. 154(b) by 248 days.

(21) Appl. No.: 16/069,583

(22) PCT Filed: Jan. 4, 2017

(86) PCT No.: PCT/EP2017/050122
§ 371 (c)(1),
(2) Date: Jul. 12, 2018

(87) PCT Pub. No.: WO2017/121667
PCT Pub. Date: Jul. 20, 2017

(65) Prior Publication Data
US 2019/0016987 A1    Jan. 17, 2019

(30) Foreign Application Priority Data
Jan. 13, 2016 (EP) .................................... 16151058

(51) Int. Cl.
| | | |
|---|---|---|
| *C10M 173/02* | (2006.01) |
| *C10M 169/04* | (2006.01) |
| *C08F 220/18* | (2006.01) |
| *C10M 145/14* | (2006.01) |
| *C08L 33/06* | (2006.01) |
| *C08J 3/09* | (2006.01) |
| *C10N 20/02* | (2006.01) |
| *C10N 20/00* | (2006.01) |
| *C10N 30/02* | (2006.01) |
| *C10N 30/00* | (2006.01) |
| *C10N 40/04* | (2006.01) |
| *C10N 40/08* | (2006.01) |
| *C10N 40/20* | (2006.01) |
| *C10N 40/25* | (2006.01) |
| *C10N 50/10* | (2006.01) |
| *C10N 70/00* | (2006.01) |

(52) U.S. Cl.
CPC ....... *C10M 169/041* (2013.01); *C08F 220/18* (2013.01); *C08J 3/092* (2013.01); *C08L 33/06* (2013.01); *C10M 145/14* (2013.01); *C08F 220/1818* (2020.02); *C08F 2800/20* (2013.01); *C10M 2203/003* (2013.01); *C10M 2203/1025* (2013.01); *C10M 2209/084* (2013.01); *C10N 2020/02* (2013.01); *C10N 2020/069* (2020.05); *C10N 2020/071* (2020.05); *C10N 2030/02* (2013.01); *C10N 2030/68* (2020.05); *C10N 2040/04* (2013.01); *C10N 2040/042* (2020.05); *C10N 2040/044* (2020.05); *C10N 2040/08* (2013.01); *C10N 2040/20* (2013.01); *C10N 2040/25* (2013.01); *C10N 2050/10* (2013.01); *C10N 2070/02* (2020.05)

(58) Field of Classification Search
CPC ............ C10M 169/041; C10M 145/14; C10M 2203/1025; C10M 2203/003; C10M 2209/084; C08L 33/06; C08F 220/18; C08F 220/1818; C08F 2800/20; C10N 2020/02; C10N 2020/069; C10N 2020/071; C10N 2030/02; C10N 2030/68; C10N 2040/04; C10N 2040/08; C10N 2040/20; C10N 2040/25; C10N 2040/042; C10N 2040/044
USPC ......................................................... 508/507
See application file for complete search history.

(56) References Cited

U.S. PATENT DOCUMENTS

| | | | |
|---|---|---|---|
| 5,478,875 A | 12/1995 | Dubs et al. | |
| 6,497,812 B1 | 12/2002 | Schinski | |
| 6,746,993 B2 | 6/2004 | Yuki et al. | |
| 8,067,349 B2 | 11/2011 | Stoehr et al. | |
| 8,513,172 B2 | 8/2013 | Baum et al. | |
| 2010/0190671 A1 | 7/2010 | Stoehr et al. | |
| 2012/0135902 A1* | 5/2012 | Baum ................. | C10M 149/06 508/464 |
| 2015/0184109 A1* | 7/2015 | Matsui ................ | C10M 145/14 508/364 |
| 2015/0322370 A1 | 11/2015 | Matsui et al. | |

FOREIGN PATENT DOCUMENTS

| | | |
|---|---|---|
| EP | 0565487 A2 | 10/1993 |
| EP | 2009074 A1 | 12/2008 |

(Continued)

OTHER PUBLICATIONS

"Chapter 11—Polymethacrylate Viscosity Modifiers and Pour Point Depressant", Lubricant Additives, Chemistry and Applications, ed. Leslie R. Rudnick, CRC Press, Second Edition, 2009, pp. 315-338.

(Continued)

*Primary Examiner* — Prem C Singh
*Assistant Examiner* — Francis C Campanell
(74) *Attorney, Agent, or Firm* — Faegre Drinker Biddle & Reath LLP

(57) ABSTRACT

The presently claimed invention is directed to poly(meth)acrylate copolymers containing alkyl(meth)acrylate comonomer with branched C17 alkyl group. The invention is further related to lubricating oil compositions comprising poly(meth)acrylate copolymers containing alkyl(meth)acrylate comonomer with branched C17 alkyl group as viscosity index improving component.

15 Claims, No Drawings

(56) References Cited

FOREIGN PATENT DOCUMENTS

| EP | 2573149 A1 | 3/2013 |
|----|------------|--------|
| JP | 2008-106191 A | 5/2008 |
| JP | 2014015584 A | 1/2014 |
| JP | 2014136772 A | 7/2014 |
| WO | 2007/116759 A1 | 10/2007 |
| WO | WO-2009124979 A1 | 10/2009 |
| WO | WO-2011064190 A1 | 6/2011 |
| WO | WO-2011134694 A1 | 11/2011 |
| WO | WO-2014017553 A1 | 1/2014 |

OTHER PUBLICATIONS

European Search Report for EP Patent Application No. 16151058.1, dated Mar. 31, 2016, 3 pages. (All References Previously Cited).
Fleischhaker, F., et al., "Glass-Transition-, Melting-, and Decomposition Temperatures of Tailored Polyacrylates and Polymethacrylates: General Trends and Structure-Property Relationships", Macromolecular Chemistry and Physics, 2014, vol. 215, Issue 12, pp. 1192-1200.
International Search Report for PCT/EP2017/050122 dated Feb. 8 2017.
Written Opinion of the International Searching Authority for PCT/EP2017/050122 dated Feb. 8, 2017.

* cited by examiner

POLY(METH)ACRYLATE COPOLYMERS WITH BRANCHED C17 ALKYL CHAINS AND THEIR USE IN LUBRICANT OIL COMPOSITIONS

CROSS-REFERENCE TO RELATED APPLICATIONS

This application is a national stage application (under 35 U.S.C. § 371) of PCT/EP2017/050122, filed Jan. 4, 2017, which claims benefit of European Application No. 16151058.1, filed Jan. 13, 2016, both of which are incorporated herein by reference in their entirety.

The presently claimed invention is directed to poly(meth) acrylate copolymers containing alkyl (meth)acrylate comonomer with branched C17 alkyl group. The invention is further related to lubricating oil compositions comprising poly(meth)acrylate copolymers containing alkyl(meth) acrylate comonomer with branched C17 alkyl group as viscosity index improving component.

Poly(meth)acrylates (PMAs) are known as excellent viscosity index improvers in multigrade lubricating oils (L. R. Rudnick (ed) Lubricant Additives, Chemistry and Applications, CRC Press, Taylor & Francis Group, LLC, $2^{nd}$ ed., 2009, 315-338).

PMAs typically represent linear copolymers formed from two or three comonomer units: methacrylates with short, long, and eventually intermediate alkyl chains. Molecular weight varies from 25,000 to 500,000 g/mol while there is the problem that the shear stability of the polymer decreases drastically with increasing molecular weight due to chain breakage under high shear.

Shear stability can be increased by modified topology of the polymer structure like comb or star structures or introducing branched alkyl chains. The term branching is often also used in case of star or comb polymers.

U.S. Pat. No. 8,067,349 B2 and US 2010/0190671 A1 describe comb polymer structures, which are built up from macromonomers. These macromonomers are made of polyisobutylene or hydrogenated polybutadiene.

U.S. Pat. No. 8,513,172 B2 describes star polymers of poly(meth)acrylates that are made by coupling of single chains produced by controlled radical polymerization.

The branching structures in star or comb polymers are constructed with linear polymer chains. The yield of coupling reaction in case of star polymers and the incorporation of macromonomers in case of comb polymers is difficult to lead to completion because of the low reactivity reagents and macromonomers.

Branching can be introduced simpler on molecular level by using (meth)acrylate monomers with branched alkyl chains. The term (meth)acrylate as used in the present application includes both, methacrylate and acrylate derivatives.

U.S. Pat. No. 6,746,993 describes viscosity index improvers containing alkyl(meth)acrylate comonomers having branched C16-C36 alkyl groups. The branched monomers contain one branching per alkyl side chain. 2-Decyl-tetradecyl methacrylate and acrylate are mentioned as preferred monomers.

JP 2014015584 A and JP 2014136772 A describe viscosity index improvers containing alkyl(meth)acrylate comonomers having branched C16 to C36 alkyl groups. The corresponding compositions comprising the viscosity index improvers show improved shear stability.

WO 2014/017553 A1 describes viscosity index improvers containing alkyl(meth)acrylate comonomers having linear or branched C1 to C36 alkyl groups.

These applications use alkyl chains with a branching number of 1. That means the alkyl chain contains only one tertiary CH moiety that causes the branching. Although poly(meth)acrylates are known with higher branching number, their use and effect in lubricants are not known.

WO 2009/124979 A1 describes the synthesis process of alcohol mixtures having branched C17 alkyl groups.

Macromol. Chem. Phys. 2014, 215, 1192 describes the polymerization and characterization of polymethacrylate and polyacrylate homopolymers.

PMAs having high molecular weight and very good viscosity index improver properties coupled with enhanced shear stability would be beneficial, because less material would be needed to reach the requirements in the specification.

The presently claimed invention provides poly(meth) acrylate copolymers with high molecular weight having high shear stability. The poly(meth)acrylate copolymers according to the presently claimed invention are formed from branched C17 methacrylate comonomeric units. Although the branching contains only short side alkyl moieties present in relatively long alkyl chain and thus higher shear stability would not be expected from such a poly(meth)acrylate copolymer containing branched C17 methacrylate comonomeric unit, the shear stability of the poly(meth)acrylate copolymers according to the presently claimed invention surprisingly is markedly improved. Additionally, the viscosity index of a formulation made of polymers having branched C17 methacrylate instead of linear analogs increases the viscosity index of the formulation.

The viscosity of a polymer component in mineral or synthetic lubricating oil formulations depends on the molecular weight. For instance, the viscosity index is typically improved by increasing the molecular weight of the polymeric component. On the other hand, higher molecular weight has the disadvantage that shear stability is decreased. Accordingly, it is desirable to prepare polymeric components which can improve the viscosity index in lubricating oil compositions while excellent shear stability is obtained as well.

It was an object of the presently claimed invention to prepare poly(meth)acrylate copolymers capable of providing lubricating oil compositions with favorable rheology-modifying properties at low and high temperatures including high viscosity index and excellent shear stability.

The object is solved by copolymerizing branched C17 alkyl(meth)acrylates (C17MA) with selected linear or branched comonomers.

Thus, in one embodiment, the presently claimed invention is directed to a poly(meth)acrylate copolymer that is obtainable by polymerizing a mixture comprising (A) C17 alkyl (meth)acrylate, where C17 alkyl chain is branched with a mean degree of branching (iso-index) between 2.0 and 4.0, preferably between 2.8 to 3.7,
(B) methyl methacrylate and/or methyl acrylate, and
(C) alkyl methacrylate and/or alkyl acrylate with a linear or branched C2 to C30 alkyl chain.

In a preferred embodiment of the presently claimed invention, the copolymer has a weight average molecular weight $M_w$ of from 10,000 to 800,000 g/mol, preferably from 100,000 to 750,000 g/mol, more preferably from 300,000 to 700,000 g/mol, and most preferably from 300,000 to 700,000 g/mol, determined according to DIN 55672-1.

In another preferred embodiment of the presently claimed invention, the amount of comonomer (A) is from 10 to 80 wt.-%, preferably from 25 to 60 wt.-%, more preferably from 30 to 50 wt.-%, and most preferably from 35 to 45 wt.-%, based on the total weight of the poly(meth)acrylate copolymer.

In another preferred embodiment of the presently claimed invention, the amount of comonomer (B) is from 5 to 40 wt.-%, preferably from 10 to 35 wt.-%, more preferably from 15 to 35 wt.-%, and most preferably from 15 to 30 wt.-%, based on the total weight of the poly(meth)acrylate copolymer.

In another preferred embodiment of the presently claimed invention, the amount of comonomer (C) is from 15 to 80 wt.-%, preferably from 25 to 70 wt.-%, more preferably from 30 to 70 wt.-%, and most preferably from 35 to 70 wt.-%, based on the total weight of the poly(meth)acrylate copolymer.

In another preferred embodiment of the presently claimed invention, the comonomer (C) is an alkyl methacrylate and/or alkyl acrylate with a linear or branched C2 to C30 alkyl chain having a mean degree of branching of 1.0 selected from the group consisting of ethyl, n-propyl, iso-propyl, n-butyl, iso-butyl, sec-butyl, tert-butyl, pentyl, hexyl, heptyl, octyl, 2-ethylhexyl, 2-propyl heptyl, nonyl, decyl, stearyl, lauryl, octadecyl, heptadecyl, nonadecyl, eicosyl, henicosyl, docosyl, tricosyl, tetracosyl, pentacosyl, hexacosyl, heptacosyl, octacosyl, nonacosyl, triacontyl and behenyl.

Another embodiment of the presently claimed invention is directed to a concentrate composition for use in lubricating oils comprising:
(i) diluent, and
(ii) from 30 to 70 wt.-% of the poly(meth)acrylate copolymer according to the presently claimed invention.

Another embodiment of the presently claimed invention is directed to a lubricating oil composition comprising:
(a) a base oil,
(b) the poly(meth)acrylate copolymer according to the presently claimed invention, and
(c) additives.

Another embodiment of the presently claimed invention is directed to a lubricating oil composition comprising
  0.1 to 30 wt.-% of the poly(meth)acrylate copolymer as defined herein,
  70 to 99.9 wt.-% base oil, and
  0.05 to 20 wt.-% of additives,
more preferably,
  0.5 to 25.0 wt.-% of the poly(meth)acrylate copolymer,
  75 to 99.0 wt.-% base oil, and
  0.1 to 15 wt.-% of additives;
even more preferably,
  1.0 to 15.0 wt.-% of the poly(meth)acrylate copolymer,
  80.0 to 95.0 wt.-% base oil, and
  0.5 to 15.0 wt.-% of additives;
most preferably,
  1.5 to 10.0 wt.-% of the poly(meth)acrylate copolymer,
  85.0 to 90.0 wt.-% base oil, and
  1.0 to 15.0 wt.-% of additives;
and in particular,
  2.0 to 7.0 wt.-% of the poly(meth)acrylate copolymer,
  85.0 to 90.0 wt.-% base oil, and
  5.0 to 15.0 wt.-% of additives.

In another preferred embodiment of the lubricating oil composition, the composition comprises at least one additive selected from the group consisting of antioxidants, oxidation inhibitors, corrosion inhibitors, friction modifiers, metal passivators, rust inhibitors, anti-foamers, viscosity index enhancers, additional pour-point depressants, dispersants, detergents, extreme-pressure agents and/or anti-wear agents.

In another preferred embodiment of the lubricating oil composition, the composition has shear stability index as measured according to ASTM D7109 (30 pass) and as calculated by ASTM D6022 of less than 50, preferably less than 48, more preferably in the range of 41 to 47, and even more preferably in the range of 42 to 46.

In another preferred embodiment of the lubricating oil composition, the composition has high temperature high shear kinematic viscosity at 100° C. of from at least 4.00 to 6.00 mPas, preferably from at least 4.50 to 5.85 mPas, more preferably from at least 5.00 to 5.75 mPas, even more preferably from at least 5.20 to 5.70 mPas, and most preferably from at least 5.40 to 5.65 mPas as measured according to ASTM D5481 (Multicell Capillary), and high temperature high shear viscosity at 150° C. between 2.50 to 2.70 mPas, preferably from 2.55 to 2.65 mPas, as measured according to ASTM D5481 (Multicell Capillary).

In another preferred embodiment of the lubricating oil composition, the composition has viscosity index (VI) as measured by ASTM D2270 of at least 180, preferably at least 190, more preferably at least 200, even more preferably in the range of 205 to 220, and most preferably in the range of 208 to 215.

Another embodiment of the presently claimed invention is directed to the use of the lubricating oil composition in an automatic transmission fluid, a manual transmission fluid, a hydraulic fluid, a grease, a gear fluid, a metal-working fluid, a crankcase engine oil or shock absorber fluid.

Another embodiment of the presently claimed invention is directed to a method for improving the shear stability of a lubricating oil composition, wherein said method comprises the step of adding to a base oil, and an optional additive, the poly(meth)acrylate copolymer according to the presently claimed invention.

The poly(meth)acrylate copolymers according to the presently claimed invention comprise a comonomer (A) which is a C17 alkyl (meth)acrylate. The C17 alkyl (meth)acrylate preferably is a branched alkyl (meth)acrylate.

The comonomer (A) is present in the poly(meth)acrylate copolymer according to the presently claimed invention in an amount of from 5 to 80 wt.-%, more preferably from 8 to 70 wt.-%, even more preferably from 8 to 60 wt.-%, and most preferably from 8 to 50 wt.-%, and in particular from 9 to 50 wt.-%, based on the total weight of the poly(meth)acrylate copolymer according to the presently claimed invention.

The C17 alkyl chain in the C17 alkyl (meth)acrylate comonomer (A) has a mean degree of branching (iso-index) between 2.0 and 4.0, preferably between 2.8 to 3.7, more preferably between 2.9 to 3.6, even more preferably between 3.0 to 3.5 and most preferably between 3.05 to 3.40, and particularly between 3.08 to 3.20.

The mean degree of branching (iso-index) of the C17 alkyl(meth)acrylate is essential to the invention since a mean degree of branching which is not too high is important for the use of the C17 alkyl (meth)acrylate as comonomer (A) in the poly(meth)acrylate copolymers according to the presently claimed invention as well as the use of these copolymers in lubricating oil compositions for modifying the rheological properties.

In the context of the presently claimed invention, the mean degree of branching is generally defined as the number of methyl groups in a molecule of the alcohol minus 1. The mean degree of branching is the statistical mean of the degrees of branching of the molecules of a sample.

The mean degree of branching can be determined by $^1$H-NMR spectroscopy as follows: To this end, a sample of the alcohol or alcohol mixture, for instance the C17 alcohol or the C17 alcohol mixture, is first subjected to a derivatization with trichloroacetyl isocyanate (TAI). This converts the C17 alcohols to the carbamic esters.

The signals of the primary alcohols esterified in this way are at δ=4.7 to 4.0 ppm, those of esterified secondary alcohols (where present) at 5 ppm, and water present in the sample reacts with TAI to give the carbamic acid. All methyl, methylene and methine protons are in the range from 2.4 to 0.4 ppm. The signals <1 ppm are assigned to the methyl groups. From the spectrum thus obtained, it is possible to calculate the mean degree of branching (iso index) as follows:

$$\text{iso index} = ((F(CH_3)/3)/(F(CH_2OH)/2)) - 1$$

where $F(CH_3)$ is the signal area corresponding to the methyl protons and $F(CH_2OH)$ is the signal area of the methylene protons in the $CH_2OH$ group.

The C17 alcohol mixture to be used to prepare the C17 alkyl (meth)acrylate of the presently claimed invention preferably has a content of alcohols having 17 carbon atoms of at least 95% by weight, more preferably at least 98% by weight, especially at least 99% by weight, based on the total weight of the C17 alcohol mixture. The C17 alcohol mixture is especially one which consists essentially (i.e. to an extent of more than 99.5% by weight, especially to an extent of more than 99.9% by weight) of alcohols having 17 carbon atoms.

For preparation of such C17 alcohol mixtures, reference is made herein to WO 2009/124979 A1 and WO 2011/064190 A1 and the literature cited therein. These applications are incorporated by reference herein, particularly with respect to the preparation of the branched C17 alcohols and the method for determining the mean degree of branching in these molecules.

WO 2011/064190 A1 further discloses the conversion of the branched C17 alcohols to the corresponding C17 alkyl (meth)acrylates. These procedures of WO 2011/064190 A1 for obtaining the branched C17 alkyl (meth)acrylates are also incorporated by reference.

The C17 alcohol mixtures have a high purity of at least 95% by weight and a mean degree of branching of 2.8 to 3.7. The process according to the invention for preparing (meth) acrylic esters therefore likewise affords C17 alkyl (meth) acrylates with a high purity. C17 alkyl (meth)acrylates obtainable commercially to date are typically mixtures of C16 and C18 alkyl (meth)acrylates. As a result, the mixing and isomer ratios in different batches may be different. To date, this has had an adverse effect on the properties of the resulting (co)polymers.

Therefore, a particularly advantageous feature in this context is the low solidification point of the (meth)acrylic esters of C17 alcohol mixtures prepared by the processes according to WO 2009/124979 A1 and WO 2011/064190 A1. Owing to this high purity and the constant degree of branching, the solidification point (at atmospheric pressure) is preferably below 0° C., more preferably below −20° C., and even more preferably below −40° C.

The processes according to WO 2009/124979 A1 and WO 2011/064190 A1 are further advantageous since a high degree of esterification is attained and high yields are achieved. In addition, no significant polymer formation occurs in the course of esterification or workup, and the end product is substantially colorless.

The comonomer (B) of the poly(meth)acrylate copolymer of the presently claimed invention is a methyl (meth)acrylate comonomer. That is, the comonomer (B) is either a methyl methacrylate or a methyl acrylate or a mixture thereof.

The comonomer (B) is present in the poly(meth)acrylate copolymer according to the presently claimed invention in an amount of from 5 to 40 wt.-%, more preferably from 10 to 35 wt.-%, even more preferably from 15 to 35 wt.-%, and most preferably from 20 to 35 wt.-%, based on the total weight of the poly(meth)acrylate copolymer according to the presently claimed invention.

The comonomer (C) of the poly(methy)acrylate copolymer of the presently claimed invention is selected from an alkyl methacrylate and/or alkyl acrylate with a linear or branched C2 to C30 alkyl chain, preferably a linear or branched C2 to C22 alkyl chain, or more preferably a linear or branched C2 to C18 alkyl chain.

The comonomer (C) can preferably be a linear, crosslinking-type or branched comonomer with a linear or branched C2 to C30 alkyl chain with the linear or branched C2 to C30 alkyl chain as defined below. More preferably, the comonomer (C) is linear or being branched having a branching degree of 1.0.

A crosslinking-type comonomer is a polyfunctional comonomer allowing creating a crosslinked copolymer upon covalently linking polymer chains.

In general, the comonomer (C) is an alkyl methacrylate and/or alkyl acrylate with a linear or branched C2 to C30 alkyl chain, wherein the linear or branched C2 to C30 alkyl chain have a mean degree of branching of 1.0 and wherein the C2 to C30 alkyl chain is selected from ethyl, n-propyl, iso-propyl, n-butyl, iso-butyl, sec-butyl, tert-butyl, pentyl, hexyl, heptyl, octyl, 2-ethylhexyl, 2-propyl heptyl, nonyl, decyl, stearyl, lauryl, octadecyl, heptadecyl, nonadecyl, eicosyl, henicosyl, docosyl, tricosyl, tetracosyl, pentacosyl, hexacosyl, hexacosyl, octacosyl, nonacosyl, triacontyl and behenyl.

Especially preferred as the comonomer (C) are stearyl and/or lauryl (meth)acrylate comonomer, particularly in cases when comonomer (B) is methyl methacrylate and/or methyl acrylate.

The comonomer (C) is present in the poly(meth)acrylate copolymer according to the presently claimed invention in an amount of from 20 to 80 wt.-%, more preferably from 25 to 70 wt.-%, even more preferably from 30 to 70 wt.-%, and most preferably from 35 to 70 wt.-%, based on the total weight of the poly(meth)acrylate copolymer according to the presently claimed invention.

In another very preferred embodiment of the presently claimed invention the poly(meth)acrylate copolymer according to the presently claimed invention preferably comprises comonomer (A) in an amount of 5 to 80 wt.-%, comonomer (B) in an amount of 5 to 40 wt.-% and comonomer (C) in an amount of 20 to 80 wt.-%.

In yet another very preferred embodiment of the presently claimed invention the poly(meth)acrylate copolymer according to the presently claimed invention preferably comprises comonomer (A) in an amount of 8 to 70 wt.-%, comonomer (B) in an amount of 10 to 35 wt.-% and comonomer (C) in an amount of 30 to 70 wt.-%.

In still another very preferred embodiment of the presently claimed invention the poly(meth) acrylate copolymer according to the presently claimed invention preferably comprises comonomer (A) in an amount of 8 to 60 wt.-%, comonomer (B) in an amount of 15 to 35 wt.-% and comonomer (C) in an amount of 35 to 70 wt.-%.

The use of hydroxyl-, epoxy- and/or amino-functional (meth)acrylate monomers as well as other functionally modified (meth)acrylate monomers is also generally possible although pure alkyl acrylates which have no further functional groups like for instance hydroxyl-, epoxy-, and/or amino-functional groups or the like are more preferred as the comonomers (A), (B) and (C).

Optionally, as further comonomers in addition to the essential comonomers (A), (B) and (C), up to 50 wt.-%, preferably up to 20 wt.-%, more preferably up to 10 wt.-%, even more preferably up to 5 wt.-%, and most preferably up to 2 wt.-% of the following monomers, which are listed by way of example, can be employed in the poly(meth)acrylate copolymers according to the presently claimed invention: vinyl aromatic compounds, such as styrene, alpha-methyl styrene, vinyl toluene or p-(tert-butyl) styrene; acrylic and methacrylic acid; acrylamide and methacrylamide; maleic acid and the imides and C1 to C10-alkyl esters thereof; fumaric acid and the imides and C1 to C10-alkyl esters thereof; itaconic acid and the imides and C1 to C10-alkyl esters thereof; acrylonitrile and methacrylonitrile.

On the other hand, it is more preferred that the poly(meth) acrylate copolymer of the presently claimed invention consists of only the comonomers (A), (B) and (C) exclusively, in the sense that no additional comonomer except the comonomers (A), (B) and (C) is present.

The molecular weight distribution measured by GPC analysis using polystyrene standards is preferably less than 5.0 and generally ranges from 2.0 to 4.5, preferably from 3.0 to 4.4, and more preferably from 3.1 to 4.3.

The molecular weight is determined by GPC using a poly methyl methacrylate standard. The determined average molecular weight is therefore relative to the standard not absolute.

Conventional methods of free-radical polymerization can be used to prepare the poly(meth)acrylate copolymers of the presently claimed invention. Polymerization of the corresponding alkyl methacrylate monomers can take place under a variety of conditions, including bulk polymerization, solution polymerization, usually in an organic solvent, preferably mineral oil.

In the solution polymerization, the reaction mixture comprises a diluent, the alkyl(meth)acrylate monomers to be polymerized, a polymerization initiator and usually a chain transfer agent and optionally a crosslinker.

The diluent may be any inert hydrocarbon. The concentration of total monomers may range from 30 to 90%. As used herein, "total monomer charge" means the combined amount of all monomers in the initial, i.e., unreacted, reaction mixture.

In preparing the poly(meth)acrylate copolymers of the presently claimed invention by free-radical polymerization the alkyl methacrylate monomers may be polymerized simultaneously or sequentially or the monomers may be fed over time to the reaction vessel. For example, the blend of C1, C2 to C30, preferably C2 to C18, alkyl(meth)acrylate monomers and the branched C17 alkyl (meth)acrylate monomer component may be fed over time to a reaction vessel along with an initiator feed.

Suitable polymerization initiators include initiators which disassociate upon heating to yield a free radical, e.g., peroxide compounds such as benzoyl peroxide, t-butyl perbenzoate, t-butyl peroctoate and cymene hydroperoxide; and azo compounds such as azo isobutyronitrile and 2,2'-azobis (2-methylbutanenitrile). The mixture includes from 0.001 wt.-% to 5.0 wt.-% initiator relative to the total monomer mixture. For example, 0.02 wt.-% to 4.0 wt.-%, 0.02 wt.-% to 3.5 wt.-% are envisioned. Typically 0.02 wt.-% to 2.0 wt.-% are used.

Suitable chain transfer agents include those conventional in the art such as mercaptanes and alcohols. For example, tridecyl mercaptane, dodecyl mercaptane and ethyl mercaptane, but also bifunctional mercaptanes, such hexane dithiol may be used as chain transfer agents. The selection of the amount of chain transfer agent to be used is based on the desired molecular weight of the polymer being synthesized as well as the desired level of shear stability for the polymer, i.e., if a more shear stable polymer is desired, more chain transfer agent can be added to the reaction mixture. The chain transfer agent is added to the reaction mixture or monomer feed in an amount of 0.001 to 3 wt.-% relative to the monomer mixture.

By way of example and without limitation, all components are charged to a reaction vessel that is equipped with a stirrer, a thermometer and a reflux condenser and heated with stirring under a nitrogen blanket to a temperature from 50° C. to 125° C. for a period of 0.5 hours to 15 hours to carry out the polymerization reaction.

A viscous solution of the copolymer of the presently claimed invention in the diluent is obtained as the product of the above-described process.

The presently claimed invention is also directed to a concentrate composition of the poly (meth)acrylate copolymer of the presently claimed invention.

The concentrate composition is preferably intended for the use in lubricating oils. The concentrate composition can be diluted by the addition of at least one diluent, and, optionally by the addition of further additives thereby obtaining a lubricating oil composition from the concentrate composition according to the presently claimed invention. One preferred diluent is base oil.

The amount of the poly(meth)acrylate copolymer in the concentrate composition is generally in the range of from 20 to 95 wt.-%, preferably from 25 to 85 wt.-%, more preferably from 30 to 75 wt.-%, and most preferably from 30 to 70 wt.-% based on the total weight of the concentrate composition.

Accordingly, to form the lubricating oils of the presently claimed invention, a base oil is treated or mixed with the poly(meth)acrylate copolymer of the presently claimed invention in a conventional manner, i.e., by providing the poly(meth)acrylate copolymer according to the presently claimed invention and adding it to the base oil with further optional additives to provide a lubricating oil composition having the desired technical specification and the required concentration of components.

In a particularly preferred embodiment, the poly(meth) acrylate copolymer according to the presently claimed invention is added to the base oil in the form of a relatively concentrated solution of the copolymer in a diluent. The diluent oil may be any of the oils referred to below that are suitable for use as base oils.

The presently claimed invention is also directed to lubricating oil compositions comprising the poly(meth)acrylate copolymer compositions according to the presently claimed invention.

The lubricating oil compositions comprise the following components:
(a) at least one base oil component,
(b) the poly(meth)acrylate copolymer as defined herein, and
(c) other additives.

The amounts of the poly(meth)acrylate copolymer of the presently claimed invention, the base oil component and the optional additive in the lubricating oil compositions are generally as follows:

In the most generic embodiment the amounts are from 0.1 to 30 wt.-% of the poly(meth)acrylate copolymer, from 70 to 99.9 wt.-% base oil, and, from 0.05 to 10 wt.-% of additives.

Preferably, the amounts are from 0.5 to 25.0 wt.-% of the poly(meth)acrylate copolymer, from 75 to 99.0 wt.-% base oil, and, from 0.1 to 20 wt.-% of additives.

More preferably, the amounts are from 1.0 to 15.0 wt.-% of the poly(meth)acrylate copolymer, from 80.0 to 95.0 wt.-% base oil, and from 0.5 to 15.0 wt.-% of additives.

Most preferably, the amounts are from 1.5 to 10.0 wt.-% of the poly(meth)acrylate copolymer, from 85.0 to 90.0 wt.-% base oil, and from 0.8 to 15.0 wt.-% of additives.

The weight ratio of the base oil component to the poly(meth)acrylate copolymer of the presently claimed invention in the lubricating oil compositions according to the presently claimed invention is generally in the range of from 10 to 1000, more preferably from 20 to 500, even more preferably from 25 to 200, and most preferably from 30 to 150.

In another preferred embodiment of the presently claimed invention, the lubricating oil composition contains from 0.1 to 10.0 parts by weight, preferably 0.2 to 5.0 parts by weight, and more preferably 0.5 to 3.0 parts by weight, of the neat copolymer (i.e. excluding diluent base oil) per 100 weight of base fluid. The preferred dosage will of course depend upon the base oil.

The lubricating oil compositions according to the presently claimed invention include at least one additive which is preferably selected from the group consisting of antioxidants, oxidation inhibitors, corrosion inhibitors, friction modifiers, metal passivators, rust inhibitors, anti-foamants, viscosity index enhancers, additional pour-point depressants, dispersants, detergents, further extreme-pressure agents and/or anti-wear agents. More preferred additives are described in more detail below.

The lubricating oil compositions according to the presently claimed invention are characterized by high shear stability as measured by the shear stability index based on D7109 European Diesel Injector (30-pass)], and calculating the shear stability index (SSI) of the lubricant compositions according to ASTM D6022. The presently claimed invention has an SSI generally less than 50, preferably less than 46, and more preferably less than 42, based on D7109 (30-pass) and SSI calculation by ASTM D6022.

Additionally or alternatively, the lubricating oil compositions according to the presently claimed invention are characterized by so-called high temperature high shear (HTHS) viscosity stability as measured by the HTHS viscosity at 100° C. and 150° C. The lubricating oil compositions according to the presently claimed invention have high temperature high shear viscosity at 100° C. of generally from at least 4.00 to 6.00 mPas, preferably from at least 4.50 to 5.85 mPas, more preferably from at least 5.00 to 5.75 mPas, even more preferably from at least 5.20 to 5.70 mPas, and most preferably from at least 5.40 to 5.65 mPass as measured according to ASTM D5481 (Multicell Capillary), and/or high temperature high shear viscosity at 150° C. generally from 2.50 to 2.70 mPas, preferably 2.55 to 2.65 mPas as measured according to ASTM D5481 (Multicell Capillary).

In addition or alternatively, the lubricating oil compositions according to the presently claimed invention further display high viscosity index (VI) as measured by ASTM D2270. Preferred viscosity index values of the lubricating oil compositions according to the presently claimed invention are at least 180, preferably at least 190, more preferably at least 200, even more preferably in the range of 205 to 220, and most preferably in the range of 208 to 215.

Additionally or alternatively, treat rates of the lubricant oil compositions according to the presently claimed invention can preferably be in some selected embodiments in the range of from 1.0 to 30.0, preferably from 2.0 to 25.0, more preferably from 2.5 to 15.0 and most preferably from 3.0 to 5.0 wt.-%.

Finally, and in addition or alternatively to the above described performance characteristics, the lubricating oil compositions according to the presently claimed invention show kinematic viscosity at 100° C. as measured according to ASTM D445 is between 6.9 and 9.3 $mm^2/s$ (cSt), between 7.2 and 9.2 $mm^2/s$, more preferably between 7.5 and 9.1 $mm^2/s$, even more preferably between 7.8 and 9.0 $mm^2/s$ and most preferably between 8.0 and 8.8 $mm^2/s$.

In summary, the lubricating oil compositions provide excellent viscosity characteristics at low and high temperatures and when subjected to high shear stress.

Preferred base oils contemplated for use in the lubricating oil compositions according to the presently claimed invention include mineral oils, poly-alpha-olefin synthetic oils and mixtures thereof. Suitable base oils also include base stocks obtained by isomerization of synthetic wax and slack wax, as well as base stocks produced by hydrocracking (rather than solvent extracting) the aromatic and polar components of the crude. In general, both the mineral and synthetic base oils will each have a kinematic viscosity ranging from 1 to 40 $mm^2/s$ at 100° C., although typical applications will require each oil to have a viscosity ranging from 1 to 10 $mm^2/s$ at 100° C.

The mineral oils useful in this invention include all common mineral oil base stocks. This would include oils that are naphthenic, paraffinic or aromatic in chemical structure. Naphthenic oils are made up of methylene groups arranged in ring formation with paraffinic side chains attached to the rings. The pour point is generally lower than the pour point for paraffinic oils. Paraffinic oils comprise saturated, straight chain or branched hydrocarbons. The straight chain paraffins of high molecular weight raise the pour point of oils and are often removed by dewaxing. Aromatic oils are hydrocarbons of closed carbon rings of a semi-unsaturated character and may have attached side chains. This oil is more easily degraded than paraffinic and naphthenic oils leading to corrosive by-products.

In reality a base stock will normally contain a chemical composition which contains some proportion of all three (paraffinic, naphthenic and aromatic). For a discussion of types of base stocks, see Motor Oils and Engine Lubrication by A. Schilling, Scientific Publications, 1968, section 2.2 thru 2.5.

The poly(meth)acrylate copolymer may be used in paraffinic, naphthenic and aromatic type oils. For example, the poly(meth)acrylate copolymer may be used in Groups I-V base oils. These Groups are well known by those skilled in the art. Additionally, the poly(meth)acrylate copolymer may be used in gas to liquid oils.

Gas to liquid oils (GTL) are well known in the art. Gaseous sources include a wide variety of materials such as natural gas, methane, C1-C3 alkanes, landfill gases, and the like. Such gases may be converted to liquid hydrocarbon products suitable for use as lubricant base oils by a gas to liquid (GTL) process, such as the process described in U.S. Pat. No. 6,497,812, the disclosure of which is incorporated herein by reference.

Base oils derived from a gaseous source, hereinafter referred to as "GTL base oils", typically have a viscosity index of greater than 130, a sulfur content of less than 0.3 wt.-%, contain greater than 90 wt.-% saturated hydrocarbons (isoparaffins), typically from 95 to 100 wt.-% branched aliphatic hydrocarbons, have a pour point of below −15 to −20 C.

The GTL base oils may be mixed with more conventional base oils such as Groups I to V as specified by API. For example, the base oil component of the lubricant compositions may include 1 to 100 wt.-% to a GTL base oil.

Thus a lubricating oil composition may be at least partially derived from a gaseous source and contain the instant poly(meth)acrylate copolymer as a pour point depressant.

Oils may be refined by conventional methodology using acid, alkali, and clay or other agents such as aluminum chloride, or they may be extracted oils produced, for example, by solvent extraction with solvents such as phenol, sulfur dioxide, furfural, dichlorodiethyl ether, etc. They may be hydrotreated or hydrorefined, dewaxed by chilling or catalytic dewaxing processes, or hydrocracked. The mineral oil may be produced from natural crude sources or be composed of isomerized wax materials or residues of other refining processes. The preferred synthetic oils are oligomers of a-olefins, particularly oligomers of 1-decene, also known as poly-alphaolefins or PAO's.

The base oils may be derived from refined, re-refined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Re-refined oils are obtained by treating used oils in processes similar to those used to obtain the refined oils.

These re-refined oils are also known as reclaimed or reprocessed oils and are often additionally processed by techniques for removal of spent additives and oils breakdown products.

Optional Customary Oil Additives

The addition of at least one additional customary oil additive to the lubricating oil compositions of the presently claimed invention is possible but not mandatory in every case. The mentioned lubricant compositions, e.g. greases, gear fluids, metal-working fluids and hydraulic fluids, may additionally comprise further additives that are added in order to improve their basic properties still further.

Such additives include: further antioxidants or oxidation inhibitors, corrosion inhibitors, friction modifiers, metal passivators, rust inhibitors, anti-foamants, viscosity index enhancers, additional pour-point depressants, dispersants, detergents, further extreme-pressure agents and/or anti-wear agents.

Such additives are present in the amounts customary for each of them, which range in each case from 0.01 to 10.0 wt.-%, preferably from 0.05 to 3.0 wt.-%, and more preferably from 0.1 to 1.0 wt.-% based on the total weight of the lubricating oil composition. Examples of further additives are given below:

1. Examples of Phenolic Antioxidants:

1.1. Alkylated monophenols: 2,6-di-tert-butyl-4-methylphenol, 2-butyl-4,6-dimethylphenol, 2,6-ditert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side chain, such as, for example, 2,6-dinonyl-4-methylphenol, 2,4-dimethyl-6-(1'-methyl-undec-1'-yl)-phenol, 2,4-dimethyl-6-(1'-methylheptadec-1'-yl)-phenol, 2,4-dimethyl-6-(1'-methyltridec-1'-yl)-phenol and mixtures thereof;

1.2. Alkylthiomethylphenols: 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

1.3. Hydroquinones and alkylated hydroquinones: 2,6-di-tert-butyl-4-methoxyphenol, 2,5-di-tertbutylhydroquinone, 2,5-di-tert-amylhydroquinone, 2,6-diphenyl-4-octadecyloxyphenol, 2,6-ditert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate;

1.4. Tocopherols: alpha-, beta-, gamma- or delta-tocopherol and mixtures thereof (like for instance vitamin E);

1.5. Hydroxylated thiodiphenyl ethers: 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxy-phenyl)disulfide;

1.6. Alkylidene bisphenols: 2,2'-methylene-bis(6-tert-butyl-4-methylphenol), 2,2'-methylene-bis(6-tert-butyl-4-ethylphenol), 2,2'-methylene-bis[4-methyl-6-(alpha-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(alpha-methylbenzyl)-4-nonylphenol], 2,2'-methylene-bis[6-(alpha, alpha-dimethyl-benzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)-butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methyl phenyl]terephthalate, 1,1-bis(3,5-dimethyl-2-hydroxyphenyl)butane, 2,2-bis(3,5-di-tert-butyl-4-hydroxyphenyl)-propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane;

1.7. O-. N- and S-benzyl compounds: 3,5,3',5'-tetra-tert-butyl-4,4'-dihydroxydibenzyl ether, octadecyl-4-hydroxy-3,5-dimethylbenzyl-mercaptoacetate, tridecyl-4-hydroxy-3,5-di-tert-butylbenzyl-mercaptoacetate, tris (3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl-mercaptoacetate;

1.8. Hydroxybenzylated malonates: dioctadecyl-2,2-bis (3,5-di-tert-butyl-2-hydroxybenzyl)malonate, dioctadecyl- 2-(3-tert-butyl-4-hydroxy-5-methylbenzyl)malonate, didodecylmercaptoethyl-2,2-bis(3,5-di-tert-butyl-4-hydroxybenzyl) malonate, di[4-(1,1,3,3-tetramethylbutyl)phenyl]-2,2-bis(3,5-di-tert-butyl-4-hydroxybenzyl) malonate;

1.9. Hydroxybenzyl aromatic compounds: 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

1.10. Triazine compounds: 2,4-bis-octylmercapto-6-(3,5-di-tert-butyl-4-hydroxyanilino)-1,3,5-triazin e, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris (3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl)isocyanurate;

1.11. Acylaminophenols: 4-hydroxylauric acid anilide, 4-hydroxystearic acid anilide, N-(3,5-ditert-butyl-4-hydroxyphenyl)-carbamic acid octyl ester;

1.12. Esters of beta-(5-tert-butyl-4-hydroxy-3-methylphenyl) propionic acid: with polyhydric alcohols, e.g. with 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane;

1.13. Esters of beta-(3,5-di-tert-butyl-4-hydroxyphenyl) propionic acid, .gamma.-(3,5-dicyclohexyl-4-hydroxyphenyl) propionic acid, 3,5-di-tert-butyl-4-hydroxyphenylacetic acid: with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-hydroxyethyl oxalic acid diamide, 3-thiaundecanol, 3-thiapentadecanol, trimethylhexanediol, trimethylolpropane, 4-hydroxymethyl-1-phospha-2,6,7-trioxabicyclo [2.2.2]octane;

1.14. Amides of beta-(3,5-di-tert-butyl-4-hydroxyphenyl) propionic acid: N,N'-bis(3,5-di-tert-butyl-4-hydroxyphenylpropionyl)hexamethylenediamine, N, N'-bis(3,5-di-tert-butyl-4-hydroxyphenylpropionyl)trimethylenediamine, N, N'-bis(3,5-di-tert-butyl-4-hydroxyphenylpropionyl)hydrazine;

1.15. Ascorbic acid (vitamin C);

1.16. Aminic antioxidants: N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'dicyclohexyl-p-phenylenediamine, N,N'-diphenyl-p-phenylenediamine, N,N'-di(naphth-2-yl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'phenyl-p-phenylenediamine, 4-(p-toluenesulfonamido)-diphenylamine, N,N'-dimethyl-N,N'-disec-butyl-p-phenylenediamine, diphenylamine, N-allyldiphenylamine, 4-isopropoxydiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethyl phenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]-ethane, 1,2-di(phenylamino)propane, (o-tolyl)biguanide, di[4-(1',3'-dimethylbutyl)phenyl]amine, tert-octylated N-phenyl-1-naphthylamine, mixture of mono- and di-alkylated tert-butyl/tert-octyldiphenylamines, mixture of mono- and di-alkylated nonyidiphenylamines, mixture of mono- and di-alkylated dodecyldiphenylamines, mixture of mono- and di-alkylated isopropyl/isohexyldiphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl/tertoctyl-phenothiazines, mixtures of mono- and di-alkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one, 2,2,6,6-tetramethylpiperidin-4-ol.

2. Examples of further antioxidants: aliphatic or aromatic phosphites, esters of thiodipropionic acid or thiodiacetic acid or salts of dithiocarbamic acid, 2,2,12,12-tetramethyl-5,9-dihydroxy-3,7,11-trithiamidecane and 2,2,15,15-tetramethyl-5,12-dihydroxy-3,7, 10,14-tetrathiahexadecane.

3. Examples of Metal Deactivators. e.g. for Copper:

3.1. Benzotriazoles and derivatives thereof: 2-mercaptobenzotriazole, 2,5-dimercaptobenzotriazole, 4- or 5-alkylbenzotriazoles (e.g. tolutriazole) and derivatives thereof, 4,5,6,7-tetrahydrobenzotriazole, 5,5'-methylene-bis-benzotriazole; Mannich bases of benzotriazole or tolutriazole, such as 1-[di(2-ethylhexyl)aminomethyl]tolutriazole and 1-[di(2-ethylhexyl)aminomethyl]benzotriazole; alkoxyalkylbenzotriazoles, such as 1-(nonyloxymethyl)benzotriazole, 1-(1-butoxyethyl)-benzotriazole and 1-(1-cyclohexyloxybutyl)-tolutriazole;

3.2. 1,2,4-Triazoles and derivatives thereof: 3-alkyl-(or -aryl-) 1,2,4-triazoles, Mannich bases of 1,2,4-triazoles, such as 1-[di(2-ethylhexyl)aminomethyl]-1,2,4-triazole; alkoxyalkyl-1,2,4-triazoles, such as 1-(1-butoxyethyl)-1,2, 4-triazole; acylated 3-amino-1,2,4-triazoles;

3.3. Imidazole derivatives: 4,4'-methylene-bis(2-undecyl-5-methyl) imidazole and bis[(Nmethyl)imidazol-2-yl]carbinol-octyl ether;

3.4. Sulfur-containing heterocyclic compounds: 2-mercaptobenzothiazole, 2,5-dimercapto-1,3,4-thiadiazole, 2,5-dimercaptobenzothiadiazole and derivatives thereof; 3,5-bis [di(2-ethylhexyl)aminomethyl]-1,3,4-thiadiazolin-2-one;

3.5. Amino compounds: salicylidene-propylenediamine, salicylaminoguanidine and salts thereof.

4. Examples of Rust Inhibitors:

4.1. Organic acids, their esters, metal salts, amine salts and anhydrides: alkyl- and alkenylsuccinic acids and their partial esters with alcohols, diols or hydroxycarboxylic acids, partial amides of alkyl- and alkenyl-succinic acids, 4-nonylphenoxyacetic acid, alkoxy- and alkoxyethoxycarboxylic acids, such as dodecyloxyacetic acid, dodecyloxy (ethoxy)acetic acid and amine salts thereof, and also N-oleoyl-sarcosine, sorbitan monooleate, lead naphthenate, alkenylsuccinic acid anhydrides, e.g. dodecenylsuccinic acid anhydride, 2-(2-carboxyethyl)-1-dodecyl-3-methylglycerol and salts thereof, especially sodium and triethanolamine salts thereof.

4.2. Nitrogen-containing Compounds:

4.2.1. Tertiary aliphatic or cycloaliphatic amines and amine salts of organic and inorganic acids, e.g. oil-soluble alkylammonium carboxylates, and 1-[N,N-bis(2-hydroxyethyl)amino]-3-(4-nonylphenoxy)propan-2-ol;

4.2.2. Heterocyclic compounds: substituted imidazolines and oxazolines, e.g. 2-heptadecenyl-1-(2-hydroxyethyl)-imidazoline;

4.2.3. Sulfur-containing compounds: barium dinonyinaphthalene sulfonates, calcium petroleum sulfonates, alkylthio-substituted aliphatic carboxylic acids, esters of aliphatic 2-sulfocarboxylic acids and salts thereof.

5. Examples of additional viscosity index enhancers: polyacrylates, polymethacrylates, nitrogen containing polymethylmethacrylates, vinylpyrrolidone/methacrylate copolymers, polyvinylpyrrolidones, polybutenes, polyisobutylenes, olefin copolymers such as ethylene-propylene copolymers, styrene-isoprene copolymers, hydrated styrene-isoprene copolymers, styrene/acrylate copolymers and polyethers. Multifunctional viscosity improvers, which also have dispersant and/or antioxidant properties are known and may optionally be used in addition to the products of this invention.

6. Examples of pour-point depressants: polymethacrylates, ethylene/vinyl acetate copolymers, alkyl polystyrenes, fumarate copolymers, alkylated naphthalene derivatives.

7. Examples of dispersants/surfactants: polybutenylsuccinic acid amides or imides, polybutenylphosphonic acid derivatives, basic magnesium, calcium and barium sulfonates and phenolates.

8. Examples of extreme-pressure and anti-wear additives: sulfur- and halogen-containing compounds, e.g. chlorinated paraffins, sulfurized olefins or vegetable oils (soybean oil, rape oil), alkyl- or aryl-di- or -tri-sulfides, benzotriazoles or derivatives thereof, such as bis(2-ethylhexyl)aminomethyl tolutriazoles, dithiocarbamates, such as methylene-bis-dibutyldithiocarbamate, derivatives of 2-mercaptobenzothiazole, such as 1-[N,N-bis(2-ethylhexyl)aminomethyl]-2-mercapto-1H-1,3-benzothiazole, derivatives of 2,5-dimercapto-1,3,4-thiadiazole, such as 2,5-bis(tert-nonyidithio)-1,3,4-thiadiazole.

9. Examples of coefficient of friction reducers: lard oil, oleic acid, tallow, rape oil, sulfurized fats, amides, amines. Further examples are given in EP-A-0 565 487.

10. Examples of special additives for use in water/oil metal-working fluids and hydraulic fluids: Emulsifiers: petroleum sulfonates, amines, such as polyoxyethylated fatty amines, non-ionic surface-active substances; buffers: such as alkanolamines; biocides: triazines, thiazolinones, tris-nitromethane, morpholine, sodium pyridenethiol; processing speed improvers: calcium and barium sulfonates.

The poly(meth)acrylate copolymers according to the presently claimed invention are useful as viscosity index improvers in lubricating oil compositions and may be admixed with a base oil and at least one of the above-mentioned additives to form the desired lubricating oil composition. It is also possible to first prepare a concentrate or a so-called "additive pack" comprising the desired spectrum of additives, which can then be subsequently diluted to give the working concentrations for the intended lubricating oil composition.

Lubricating oil compositions containing the poly(meth)acrylate copolymers of the presently claimed invention may be used in a number of different applications including automatic transmission fluids, manual transmission fluids, hydraulic fluids, greases, gear fluids, metal-working fluids, crankcase engine oil applications and/or shock absorber fluids.

The poly(meth)acrylate copolymers of the presently claimed invention are useful for the preparation of lubricating oil compositions which have special technical performance characteristics.

Most importantly, the rheology profiles at low and high temperatures, including the temperature dependency of the kinematic viscosity of the lubricating oil compositions of the presently claimed invention over a broad temperature range is excellent as derivable from measuring kinematic viscosity at different temperatures, viscosity index and cold cranking simulator (CCS) testing.

Further, it is remarkable that, at the same time, the shear stability of the lubricating oil compositions of the presently claimed invention is also very good as indicated by shear stability index and other industrial parameters that are typically used for characterizing the shear stability of lubricating oils like high temperature high shear (HTHS) viscosity at increased temperature, for instance at 100° C. or 150° C.

In summary, the temperature-dependent viscosity profile in combination with the high shear stability of the lubricating oil compositions according to the presently claimed invention represents an unusual spectrum of performance characteristics for a lubricating oil composition because these effects normally negatively affect each other.

The poly(meth)acrylate copolymers also have the further advantage that reduced amounts of anti-oxidant additives need to be included in the lubricant oil compositions of the presently claimed invention in order to end up with good oxidation stability.

As a consequence, the lubricant oil compositions of the presently claimed invention are generally able to even improve fuel economy in engines.

The presently claimed invention is also directed to a method for improving the shear stability of a lubricating oil composition wherein the method comprises the step of providing the poly(meth)acrylate copolymer of the presently claimed invention and adding it to a base oil and optional additives to form a lubricating oil composition with improved shear stability.

EXAMPLES

1. Methods Measurement of the relative weight average molecular weight and molecular weight distribution of polymers was determined based on GPC measurements using polystyrene standards according to DIN 55672-1.

The kinematic viscosity at 100° C. was determined according to ASTM D445.

High temperature high shear viscosity (HTHS) at 100° C. and 150° C., respectively, were determined according to ASTM D5481.

Viscosity index (VI) was determined according to ASTM D2270.

Shear stability was determined based on the shear stability index (SSI) which was measured according to ASTM D7109 (30 pass) and calculating shear stability index (SSI) by ASTM method D6022.

2. Polymerization of Methacrylates 54 g branched C17 alkyl methacrylate (C17MA) having a branching degree of 3.1 (prepared and determined as described in WO 09/124979 A1), 45 g methyl methacrylate (MMA), 81 g linear stearyl methacrylate (SMA) and 242 mg dodecyl mercaptane as 10% Nexbase® 3030 solution were mixed in 325 g Nexbase® 3030 base oil from Neste Oil in 1 L 4-neck flask. The mixture was heated up to 95° C. resulting in a colorless, clear solution. A solution of 0.13 g tert-butylperoctoate in 6 g Nexbase 3030 was prepared and continuously fed to the flask with a rate of 0.0413 ml/min. After 3 hours 1,486 ml of this solution were fed to the product mixture within 30 min. The prepared polymer solution was stirred without any further initiator feed at 95° C. for 90 min. The solution was allowed to cool down to room temperature forming a colorless, viscous liquid.

The kinematic viscosity of 557.3 mm$^2$/s (cSt) was determined using Brookfield viscometer at 100° C. (KV100).

GPC analysis (polystyrene standard): detector: DRI Agilent 1100 UV Agilent 1100 VWD [254 nm], eluent: tetrahydrofuran+0.1% trifluoroacetic acid eluent, flow rate: 1 ml/min), concentration: 2 mg/ml, column: PL gel MIXED-B $M_n$=128 000 g/mol, $M_w$=384 000 g/mol, PDI=3.0;

Polymers containing C17MA, MMA, and SMA were prepared as above with varying C17MA and SMA content, tert-butylperoctoate and dodecylmercaptane amount. The reaction temperature, solvent, and polymer concentration were kept constant. The viscosity of the solutions at 100° C. was measured (KV100) and the polymers analyzed by GPC. The characteristics of the resultant polymers are summarized in Table 1 and Table 2.

TABLE 1

| polymer # | C17MA/ [g] | MMA/ [g] | SMA/ [g] | KV100/ [mm$^2$/s] | $M_w$ [g/mol] | PDI |
|---|---|---|---|---|---|---|
| P1 | 45 | 45 | 90 | 1020 | 490 000 | 3.3 |
| P2 | 18 | 45 | 117 | 2008 | 680 000 | 3.6 |
| P3* | 0 | 45 | 135 | 1930 | 511 000 | 3.7 |

*= outside the scope of the presently claimed invention

TABLE 2

| polymer # | C17MA/ [g] | MMA/ [g] | SMA/ [g] | KV100 [mm$^2$/s] | $M_w$ [g/mol] | PDI |
|---|---|---|---|---|---|---|
| P4 | 63 | 45 | 72 | 1302 | 429 000 | 4.2 |
| P5 | 63 | 45 | 72 | 1659 | 475 000 | 4.3 |
| P6 | 36 | 45 | 99 | 626 | 407 000 | 3.1 |
| P7 | 36 | 45 | 99 | 1023 | 536 000 | 3.3 |

3. Preparation of Motor Oil Blends

The copolymers P1 to P7 as prepared above were used for obtaining lubricating oil compositions B1 to B7.

As the base oil component in the lubricating oil compositions B1 to B7, a Group III base oil was added. As further commercially available passenger car motor oil additive package Infineum V 534 was included.

The amounts of the components in blends B1 to B7 were as follows:
 copolymer P1 to P7: 3.5-5.0 wt.-%
 Base oil component: 81.9-83.4 wt.-%
 Additive: 13.1 wt.-%

Rheology behavior and other performance characteristics of lubricating oil compositions B1 to B7 were measured. Table 3 shows that increasing C17MA content in the PMA polymer decreases the SSI, and increase the shear stability of the polymer and the corresponding formulation. Table 4 shows that polymers with higher C17MA content and comparable molecular weight result in higher VI in the oil formulation.

TABLE 3

| blend # | | treat rate [wt. %] | KV 100 [mm$^2$/s] (blend) | HTHS 150 [mPas] | HTHS 100 [mPas] | SSI (30) [—] |
|---|---|---|---|---|---|---|
| B1* | P1 | 3.85 | 8.25 | 2.63 | 5.54 | 40 |
| B2 | P2 | 3.5 | 8.47 | 2.64 | 5.46 | 44 |
| B3 | P3 | 4.0 | 8.72 | 2.62 | 5.58 | 45 |

*= outside the scope of the presently claimed invention

TABLE 4

| blend # | | treat rate [wt. %] | KV 100 [mm$^2$/s] (blend) | HTHS 150 [mPas] | HTHS 100 [mPas] | VI |
|---|---|---|---|---|---|---|
| B4 | P4 | 4.0 | 8.58 | 2.63 | 5.59 | 210 |
| B5 | P5 | 4.2 | 8.72 | 2.64 | 5.59 | 213 |
| B6 | P6 | 4.5 | 8.17 | 2.63 | 5.52 | 202 |
| B7 | P7 | 4.0 | 8.64 | 2.59 | 5.46 | 208 |

4. Polymerization of Guerbet 20 Methacrylate Having a Branching Degree of 1:

135 g branched C20 alkyl methacrylate (C20MA) having a branching degree of 1.45 g methyl methacrylate (MMA), and 60 mg dodecyl mercaptane as 10% Nexbase 3030 solution were mixed in 325 g Nexbase 3030 from Neste Oil base oil in 1 L 4-neck flask. The mixture was heated up to 95° C. resulting in a colorless, clear solution. A solution of 0.13 g tert-butylperoctoate in 6 g Nexbase 3030 is prepared and continuously fed to the flask with a rate of 0.0413 ml/min. After 3 hours 1,486 ml of this solution is fed to the product mixture within 30 min. The prepared polymer solution is then stirred without any further initiator feed at 95° C. for 90 min. The solution is allowed to cool down to room temperature forming a colorless, viscous liquid.

The kinematic viscosity of 659 mm$^2$/s (cSt) has been determined using Brookfield viscometer at 100° C. (KV100).

GPC analysis (polystyrene standard): detector: DRI Agilent 1100 UV Agilent 1100 VWD [254 nm], eluent: tetrahydrofuran+0.1% trifluoroacetic acid eluent, flow rate: 1 ml/min), concentration: 2 mg/ml, column: PLgel MIXED-B $M_n$=109 000 g/mol, $M_w$=446 000 g/mol, PDI=4.1;

Preparation of Motor Oil Blends

The copolymer has been used for obtaining lubricating oil composition.

As the base oil component, Group III has been added. As further commercially available passenger car motor oil additive package Infineum V 534 has been included.

Shear stability of the blend has been measured. An SSI of 51 was obtained.

Compared to the motor oil blends with the polymer of example 2 with a branching degree of 3.1 it can be seen that the shear stability index (table 3, last column) of the polymer with a branching degree of 1 is remarkable higher.

The higher branching degree resulted in a decrease of SSI which is related to an increase of shear stability.

The invention claimed is:
1. A poly(meth)acrylate copolymer that is obtained by polymerizing a mixture comprising:
  (A) C17 alkyl (meth)acrylate, where C17 alkyl chain is branched with a mean degree of branching between 2.0 and 4.0,
  (B) methyl methacrylate and/or methyl acrylate, and
  (C) alkyl methacrylate and/or alkyl acrylate with a linear or branched C2 to C30 alkyl chain.

2. The copolymer of claim 1, wherein the C17 alkyl chain is branched with a mean degree of branching between 2.8 and 3.7.

3. The copolymer of claim 1, wherein the copolymer has a weight average molecular weight $M_W$ of from 10,000 to 800,000 determined by gel permeation chromatography according to DIN 55672-1.

4. The copolymer of claim 1, wherein the amount of comonomer (A) is from 5 to 80 wt.-%, based on the total weight of the poly(meth)acrylate copolymer.

5. The copolymer of claim 1, wherein the amount of comonomer (B) is from 5 to 40 wt.-%, based on the total weight of the poly(meth)acrylate copolymer.

6. The copolymer of claim 1, wherein the amount of comonomer (C) is from 15 to 80 wt.-%, based on the total weight of the poly(meth)acrylate copolymer.

7. The copolymer of claim 1, wherein the linear or branched C2 to C30 alkyl chain is selected from the group consisting of ethyl, n-propyl, iso-propyl, n-butyl, iso-butyl, sec-butyl, tert-butyl, pentyl, hexyl, heptyl, octyl, 2-ethylhexyl, 2-propyl heptyl, nonyl, decyl, stearyl, lauryl, octadecyl, heptadecyl, nonadecyl, eicosyl, henicosyl, docosyl, tricosyl, tetracosyl, pentacosyl, hexacosyl, hexacosyl, octacosyl, nonacosyl, triacontyl and behenyl.

8. A concentrate composition for use in lubricating oils comprising:
   (i) diluent, and
   (ii) from 30 to 70 wt.-% of the poly(meth)acrylate copolymer according to claim 1.

9. A lubricating oil composition comprising:
   (a) a base oil,
   (b) the poly(meth)acrylate copolymer according to claim 1, and
   (c) additives.

10. The lubricating oil composition of claim 9, comprising
    0.1 to 30 wt.-% of the poly(meth)acrylate copolymer according to claim 1,
    70 to 99.9 wt.-% base oil, and
    0.05 to 20 wt.-% of additives.

11. The lubricating oil composition of claim 9 wherein the additives comprise at least one additive selected from the group consisting of antioxidants, oxidation inhibitors, corrosion inhibitors, friction modifiers, metal passivators, rust inhibitors, anti-foamants, viscosity index enhancers, additional pour-point depressants, dispersants, detergents, further extreme-pressure agents and anti-wear agents.

12. The lubricating oil composition of claim 9, having shear stability index as measured according to ASTM D7109 and as calculated by ASTM D6022 of less than 50.

13. The lubricating oil composition of claim 9, having high temperature high shear viscosity at 100° C. from 4.00 to 6.00 mPas, as measured according to ASTM D5481.

14. An automatic transmission fluid, a manual transmission fluid, an hydraulic fluid, a grease, a gear fluid, a metal-working fluid, a crankcase engine oil or shock absorber fluid comprising the lubricating oil composition of claim 9.

15. A method for improving the shear stability of a lubricating oil, wherein said method comprises adding the poly(meth)acrylate copolymer according to claim 1 to a lubricating oil composition comprising a base oil and additives.

* * * * *